United States Patent
Godenzi et al.

(10) Patent No.: US 11,661,169 B2
(45) Date of Patent: May 30, 2023

(54) AIRCRAFT FLOOR STRUCTURE WITH RAIL COVERING ELEMENT SUPPORTED BY A CELLULAR STRUCTURE

(71) Applicants: Airbus (S.A.S.), Blagnac (FR); Airbus Operations (S.A.S.), Toulouse (FR)

(72) Inventors: Christian Godenzi, Toulouse (FR); Jean-Michel Corvi, Blagnac (FR); Thomas Sanpons, Toulouse (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 46 days.

(21) Appl. No.: 17/129,175

(22) Filed: Dec. 21, 2020

(65) Prior Publication Data
US 2021/0197951 A1    Jul. 1, 2021

(30) Foreign Application Priority Data
Dec. 27, 2019 (FR) ......................... 1915656

(51) Int. Cl.
*B64C 1/18* (2006.01)

(52) U.S. Cl.
CPC ..................... *B64C 1/18* (2013.01)

(58) Field of Classification Search
CPC .......... B64C 1/18; B64C 1/20; B64D 11/0696
See application file for complete search history.

(56) References Cited

U.S. PATENT DOCUMENTS

| | | | | |
|---|---|---|---|---|
| 4,577,450 | A * | 3/1986 | Large ...................... | F16B 5/01 428/116 |
| 6,219,983 | B1 * | 4/2001 | Grøkjaar Jensen .... | B61D 17/18 105/396 |
| 7,281,685 | B2 * | 10/2007 | Schoene ............ | B64D 11/0696 244/118.6 |
| 8,544,794 | B2 | 10/2013 | Ciprian | |
| 9,834,299 | B2 * | 12/2017 | Hanna ...................... | B64C 1/20 |
| 9,868,506 | B2 * | 1/2018 | Hanna .................... | H02G 3/385 |
| 11,034,455 | B2 * | 6/2021 | Werner ............. | B64D 11/0696 |
| 2006/0038071 | A1 * | 2/2006 | Schoene ............ | B64D 11/0696 244/118.6 |
| 2010/0067999 | A1 * | 3/2010 | Poupon .................... | B60N 2/07 410/105 |
| 2010/0213314 | A1 * | 8/2010 | Haselmeier .......... | H02G 3/0487 244/119 |

(Continued)

FOREIGN PATENT DOCUMENTS

| | | |
|---|---|---|
| EP | 2842866 A1 | 3/2015 |
| FR | 2891239 A1 | 3/2007 |

(Continued)

*Primary Examiner* — Benjamin P Lee
(74) *Attorney, Agent, or Firm* — KDW Firm PLLC

(57) ABSTRACT

A floor structure for an aircraft includes a rail that defines a recess having an opening and a bottom and designed to receive one or more attachment elements, a covering element arranged above a segment of the recess so as to provide a complementary bearing surface above the opening, and a cellular supporting structure having a first end that rests on the bottom of the recess, and a second end supporting the covering element. Thus, the covering element can be sufficiently thin to avoid or limit the formation of steps at the surface of the floor structure.

20 Claims, 4 Drawing Sheets

(56) References Cited

U.S. PATENT DOCUMENTS

| | | | |
|---|---|---|---|
| 2011/0095572 A1* | 4/2011 | Wary | B32B 3/263 |
| | | | 296/193.07 |
| 2012/0036809 A1* | 2/2012 | Anast | B64C 1/18 |
| | | | 52/655.1 |
| 2015/0061380 A1* | 3/2015 | Schomacker | H04B 5/0037 |
| | | | 307/9.1 |
| 2015/0225066 A1* | 8/2015 | Hanna | B64C 1/20 |
| | | | 248/503.1 |
| 2015/0225067 A1* | 8/2015 | Hanna | B64C 1/20 |
| | | | 248/503.1 |
| 2017/0088248 A1* | 3/2017 | Stahl | B64C 1/18 |
| 2019/0308670 A1 | 10/2019 | Schulz et al. | |
| 2020/0094969 A1* | 3/2020 | Werner | B64D 11/0696 |
| 2020/0122840 A1* | 4/2020 | Seibt | B64C 1/20 |

FOREIGN PATENT DOCUMENTS

| | | | | |
|---|---|---|---|---|
| FR | 2891325 A1 | 3/2007 | | |
| FR | 2935931 A1 * | 3/2010 | | B60N 2/07 |
| FR | 2953485 A1 | 6/2011 | | |

\* cited by examiner

AIRCRAFT FLOOR STRUCTURE WITH RAIL COVERING ELEMENT SUPPORTED BY A CELLULAR STRUCTURE

CROSS-REFERENCE TO RELATED APPLICATION

This application claims priority to French Patent Application FR 1915656 filed Dec. 27, 2019, the entire disclosure of which is incorporated by reference herein.

TECHNICAL FIELD

The disclosure herein relates to a floor structure for an aircraft, having, on a top side, a bearing surface, and comprising at least one rail defining a recess having an opening on the top side and a bottom opposite the opening, for receiving attachment elements within the recess.

The disclosure herein relates also to a method for manufacturing such a floor structure.

BACKGROUND

It is known practice to fix seats and monuments, such as tables, cabinets, toilets, or more generally any type of furniture, to the floor structure of an aircraft, by attachment elements engaged and retained in recesses defined by rails of the floor structure.

Most of each of these recesses remains free of any attachment element and is covered by one or more covering elements that make it possible to construct a complementary bearing surface allowing people and trolleys to move around on top of the recesses, for example in an aisle.

However, because such a covering element extends overhanging above the corresponding recess, the covering element is designed relatively thick so as to have mechanical characteristics that are sufficient to avoid the sagging of the covering element in the recess.

Consequently, such a covering element generates a step up with respect to the bearing surface.

Such a step up is obviously not desirable for issues of comfort, but also because the covering which generally covers the floor structure, including the abovementioned covering element, risks being damaged by the repeated passage of people and trolleys, in particular at the ends of the covering element.

SUMMARY

An aim of the disclosure herein is notably to provide a simple, economical and effective solution to this problem.

To this end, a floor structure for an aircraft is disclosed, having, on a top side, a bearing surface, and comprising:
  at least one rail delimiting a recess having at least one opening on the top side and a bottom opposite the opening and intended to house one or more attachment elements; and
  at least one covering element arranged above at least one segment of the rail so as to provide a complementary bearing surface above the opening.

According to the disclosure herein, the floor structure comprises at least one cellular supporting structure having a first end that rests on the bottom of the recess, and a second end opposite the first end and supporting the covering element.

The supporting of the covering element by the cellular supporting structure allows for a reduction of the thickness of the covering element.

The result thereof is a reduction of the step up generated with respect to the bearing surface, even a total absence of step up with respect to the bearing surface.

Comfort is thus enhanced for the users. If applicable, the life span of the covering disposed on the floor structure is extended by virtue of the absence of damage from repeated passages above the rail.

The cellular nature of the cellular supporting structure allows, at least, a limitation of the weight of the structure.

Preferably, the cellular supporting structure comprises cells extending in a direction going from the first end to the second end of the structure.

Preferably, an anticorrosion product is disposed in the recess at least under the cellular supporting structure and on either side of the cellular supporting structure.

In known floor structures, such a recess can be subject to corrosion, notably because of the potential presence of stagnant liquids and condensed moisture. So, it is known practice to dispose an anticorrosion product in such a recess in order to limit the corrosion problems.

The cellular supporting structure makes it possible, by the volume that it occupies within the recess, to limit the quantity of anticorrosion product required.

In the case where the cells of the structure pass right through and extend in a direction going from the first end to the second end of the structure, the cellular supporting structure allows for a uniform distribution of the anticorrosion product within the recess and therefore proves to be particularly compatible with the use of such a product.

In an embodiment of the disclosure herein, the covering element is formed in a single piece with the cellular supporting structure.

In another embodiment of the disclosure herein, the covering element is formed independently of the cellular supporting structure.

Preferably, the covering element is flush with the bearing surface.

Preferably, the floor structure comprises at least two floor panels defining the bearing surface, and the rail extends in a space defined between the two floor panels.

Preferably, the covering element is housed in the space defined between the two floor panels.

Preferably, the recess is a groove defined by the rail, and the opening is a longitudinal opening defined between two top lips of the rail.

Preferably, the opening of the recess has a narrower cross section than a maximum cross section of the recess defined between the opening and the bottom of the recess so as to allow the retention of attachment elements within the recess by abutment effect.

The disclosure herein relates also to an aircraft, comprising a floor structure of the type described above.

The disclosure herein relates also to a method for manufacturing a floor structure for an aircraft, comprising steps of:
  A) provision of a rail defining a recess having an opening on the top side and a bottom opposite the opening and intended to house one or more attachment elements;
  B) incorporation of the rail in a base floor structure having, on a top side, a bearing surface, such that the opening of the recess of the rail emerges in the bearing surface;
  C) placement, before or after the step B, of a cellular supporting structure in at least one segment of the recess of the rail, such that the cellular supporting structure has a first end that rests on the bottom of the recess, and a second end opposite the first end;

and wherein, at the end of the method, at least one covering element is supported by the second end of the cellular supporting structure, so as to provide a complementary bearing surface above the opening of the recess.

Preferably, the method further comprises a step of arrangement of an anticorrosion product in the recess at least under the cellular supporting structure and on either side of the cellular supporting structure.

BRIEF DESCRIPTION OF THE DRAWINGS

The disclosure herein will be better understood, and other details, advantages and features thereof will become apparent on reading the following description given by way of nonlimiting example and with reference to the attached drawings in which.

In all these figures, identical references can designate identical or similar elements.

DETAILED DESCRIPTION

Figure 1:
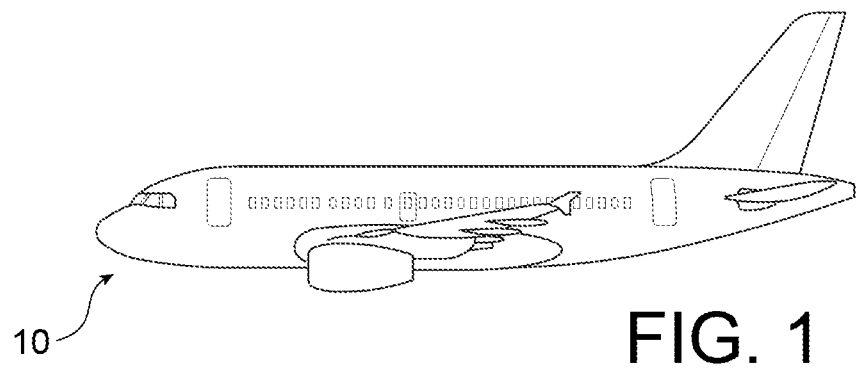
FIG. 1 is a schematic side view of an aircraft.

FIG. 1 illustrates an aircraft 10, for example an airplane of the type intended for commercial passenger or freight transport.

Figure 2:
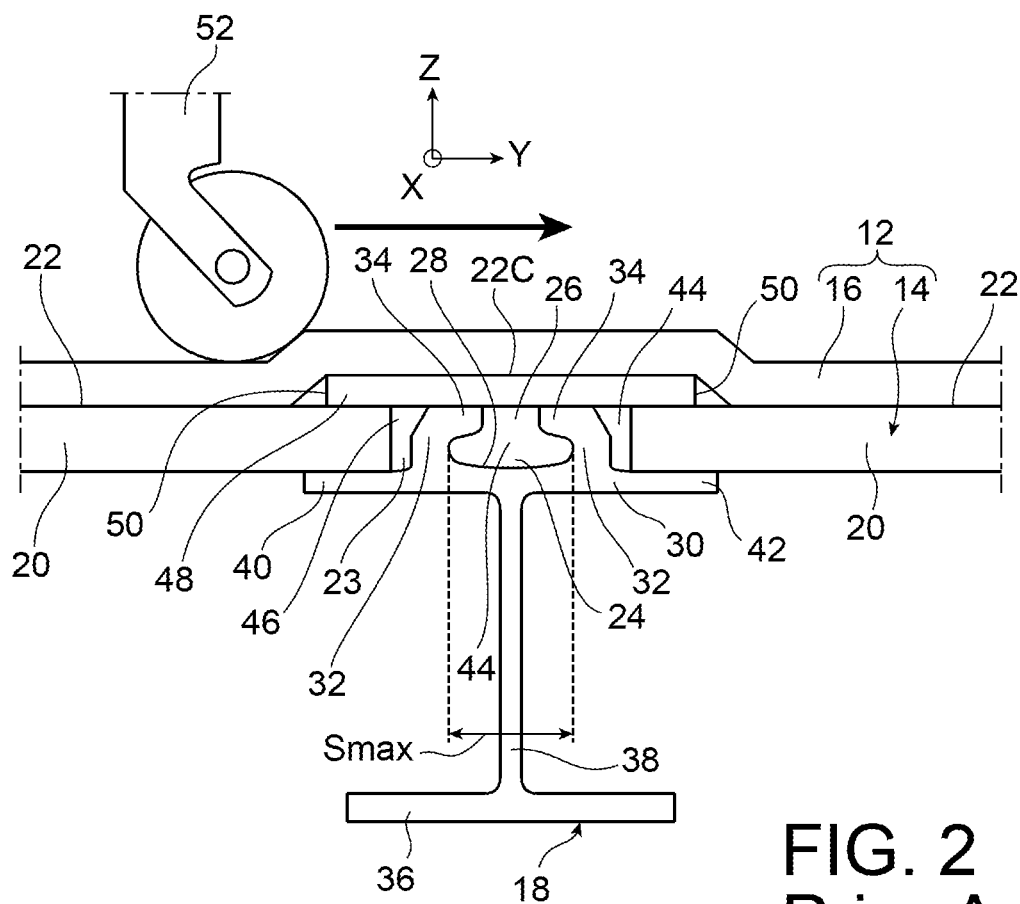
FIG. 2 is a partial schematic view in cross section of an aircraft floor structure of known type.

The floor 12 of such an aircraft, in a known configuration illustrated in FIG. 2, comprises a floor structure 14 covered by a covering 16, for example of non-textile type, also called NTF (for "non-textile floor"). Such a covering is for example made of PLA (polylactic acid), ABS (acrylonitrile butadiene styrene), PET (polyethylene terephthalate) or similar.

The floor structure 14 typically comprises a set of rails 18 on which are mounted floor panels 20 jointly defining a bearing surface 22, on a top side of the floor structure 14. In the present description, the vertical direction Z, the "top" and "bottom" sides, like the "up" and "down" directions, are defined conventionally by reference to the orientation of the aircraft when the latter is on the ground. The directions X and Y are oriented orthogonally to the vertical direction Z so as to define an orthonormal reference frame. In particular, the direction X is defined as longitudinal direction of the rails 18, and the direction Y is defined as lateral direction.

Each rail 18 thus extends in a space 23 defined between two consecutive floor panels 20.

In particular, each rail 18 delimits at least the top side of a recess 24 having an opening 26 on the top side, and a bottom 28 on the opposite side, facing the opening 26, to house one or more attachment elements within the recess 24. Such attachment elements allow the attachment of seats and monuments, such as tables, cabinets, toilets, dividers or, more generally, any kind of furniture, to the floor structure 14.

In the embodiment illustrated, the opening 26 has a narrower section than a maximum section Smax of the recess 24, defined between the opening 26 and the bottom 28 of the recess, such that the rail can retain attachment elements by abutment effect, that is to say by forming an abutment against a movement of such attachment elements upward out of the recess 24.

To this end, each rail 18 in the example illustrated comprises a top soleplate 30 defining the bottom 28 of the recess 24, and two lips 32 extending upwards from the top soleplate 30 and having respective free ends 34 bent back towards one another and delimiting, between their respective edges 35, the opening 26 of the recess 24 of the rail. The top soleplate 30 and the two lips 32 thus globally form a "C"-shaped section allowing the retention of the abovementioned attachment elements by an abutment effect produced by the lips 32. The recess 24 defined by the rail 18 is thus a groove entirely delimited by the rail, and the opening has a general longitudinal form.

In the example illustrated, each rail 18 further comprises a bottom soleplate 36, and a web 38 linking the top soleplate 30 to the bottom soleplate 36. Furthermore, the top soleplate 30 is extended on either side of the recess 24 so as to form two lateral flanges 40 and 42 on which floor panels 20 adjacent to the rail 18 considered rest.

In practice, most of the recess 24 of each rail 18 remains empty of attachment elements. To avoid the corrosion of the rail 18, notably because of the potential presence of stagnant liquids and of condensed moisture in the recess 24 or between the rail 18 and the adjacent floor panels 20, anticorrosion product 44 is disposed so as to fill the recess 24 and the spaces 46 formed between the rail 18 and the adjacent floor panels 20. In this way, in particular, all the surfaces delimiting the recess 24 are covered by the anticorrosion product 44 and are thus protected against corrosion.

Moreover, to allow free movement of passengers and trolleys above each rail 18, a covering element 48 is disposed so as to cover the rail 18, in particular the recess 24, so as to provide a complementary bearing surface 22C above the opening 26. The covering element 48, which consists of or comprises, for example, a laminated structure of glass fiber-based composite material, is thus interposed between the rail 18 and the covering 16 of the floor 12. In the typical example illustrated in FIG. 2, the covering element 48 has opposing lateral ends that rest respectively on the floor panels 20 adjacent to the rail 18, such that the covering element 48 also covers the spaces 46 formed between the rail 18 and the adjacent floor panels 20.

To limit the risks of sagging of the covering element 48, the latter has a suitable rigidity and should, because of this, have a notable thickness. Consequently, the covering element 48 forms a step up 50 at each of its lateral ends, with respect to the bearing surface 22.

In addition to the discomfort provoked by such a step up, repeated passages of people, and above all of trolleys 52, over such a step up provoke, in the long term, damage to the covering 16.

The purpose of the disclosure herein, which will now be described with reference to FIGS. 3 through 9, is to remedy the problem described above.

Figure 3:
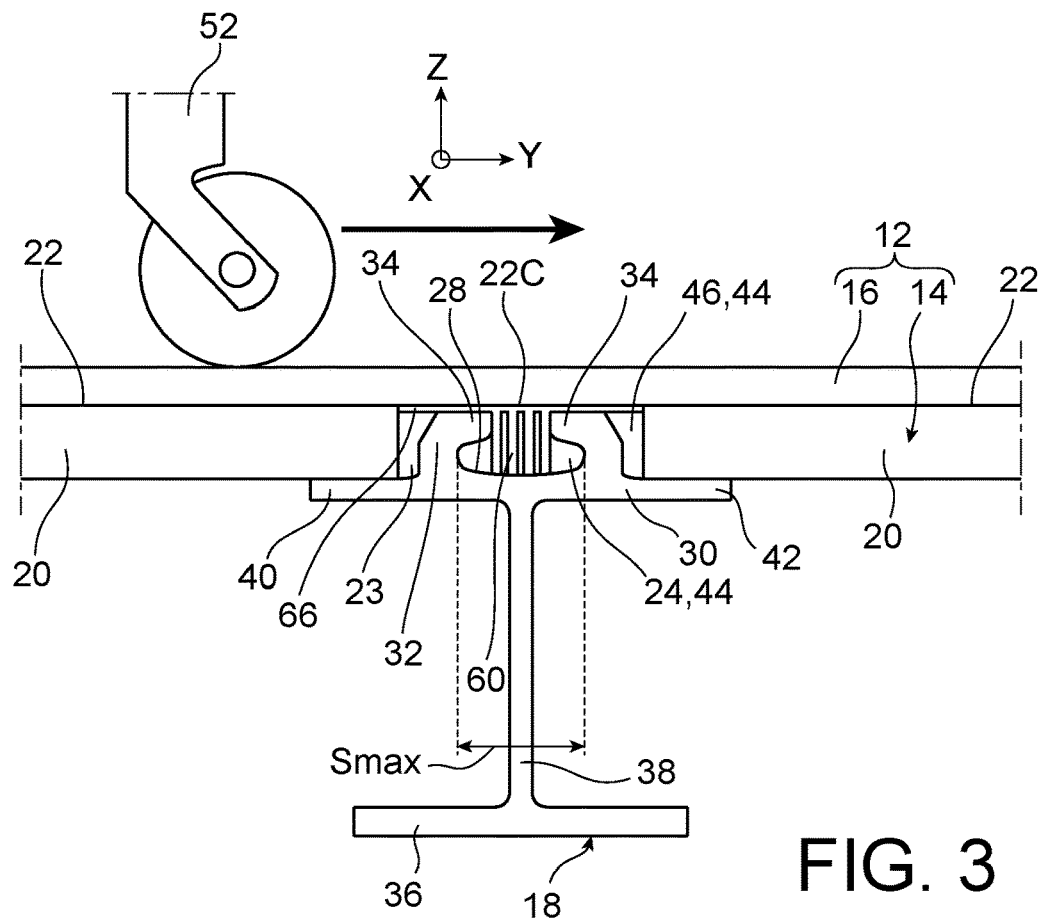
FIG. 3 is a partial schematic view in cross section of a floor structure according to a first preferred embodiment of the disclosure herein, forming part of the aircraft of FIG. 1.
Figure 3A:
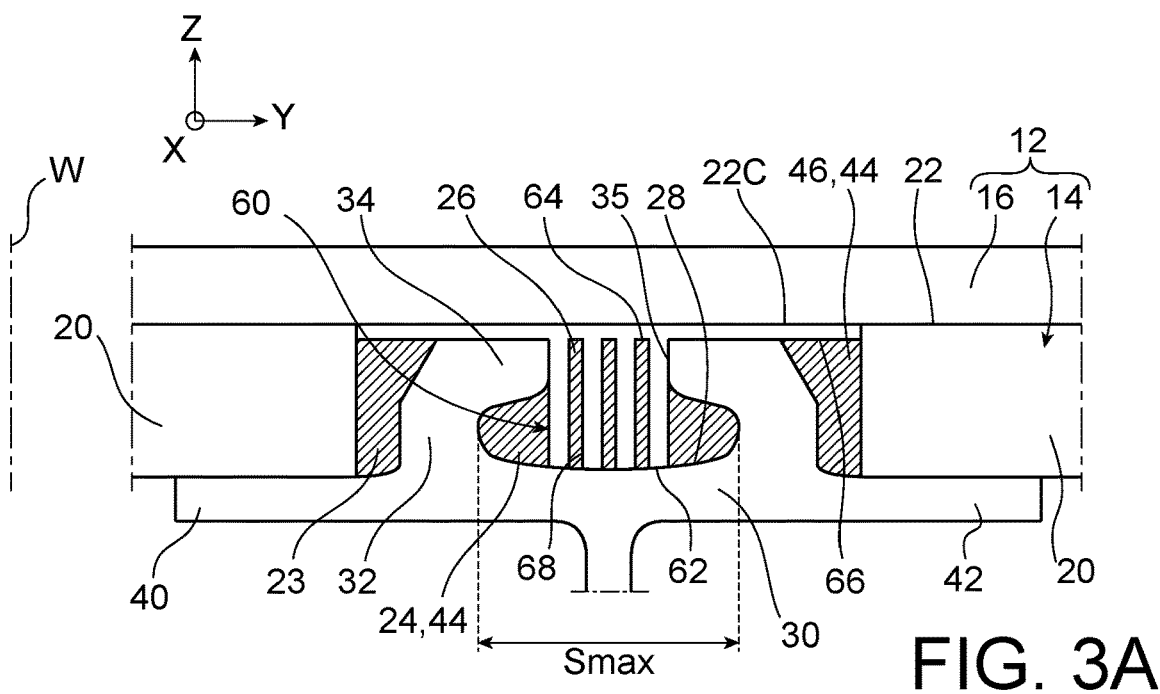
FIG. 3A is a larger-scale view of a part of FIG. 3.
Figure 4:
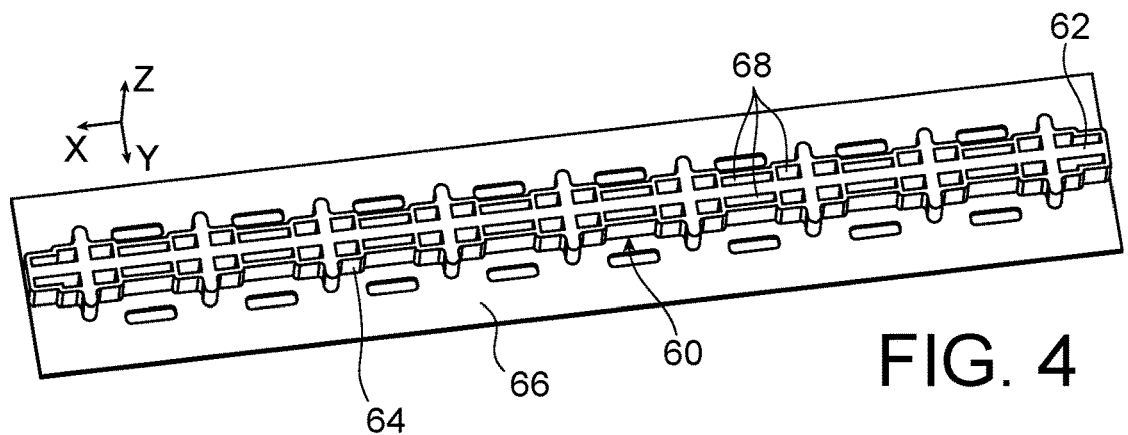
FIG. 4 is a perspective schematic view of a cellular supporting structure belonging to the floor structure of FIG. 3.

To this end, for each rail 18, the floor structure 14 comprises at least one cellular supporting structure 60 having a first end 62 that rests on the bottom 28 of the recess 24, and a second end 64 opposite the first end 62 and supporting a covering element 66, as shown in particular in FIG. 3A.

The cellular supporting structure 60 comprises cells 68 preferably extending in a direction going from the first end 62 to the second end 64, corresponding to the vertical direction Z. The cellular supporting structure 60 thus has a working direction W parallel to the direction going from the first end 62 to the second end 64, and therefore makes it possible to support loads likely to move around on the covering element 66 optimally, and therefore avoid or at least best limit the risks of sagging thereof.

Figure 5:
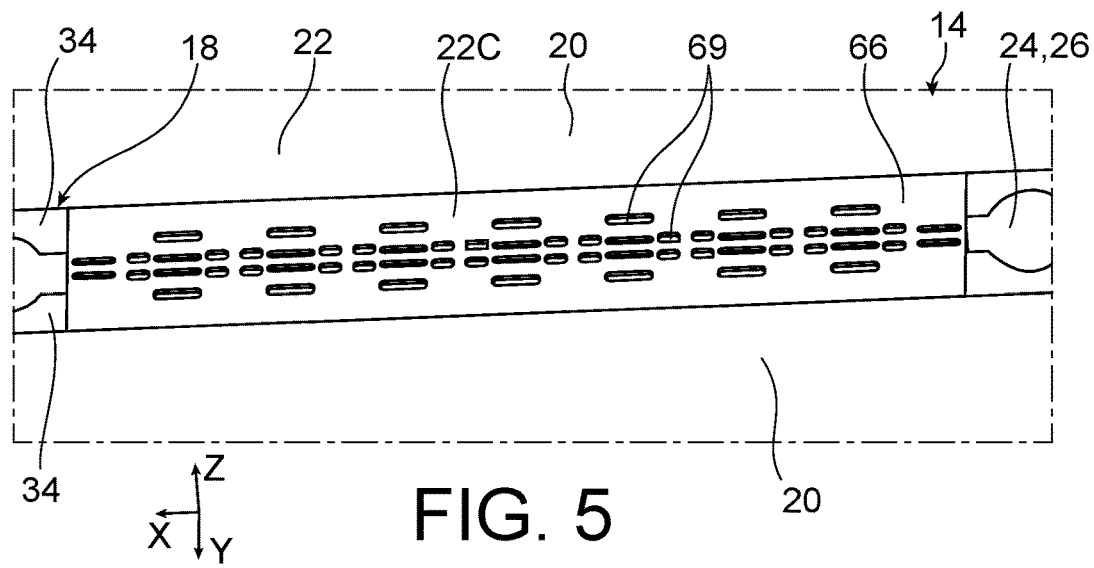
FIG. 5 is a perspective partial schematic view of the floor structure of FIG. 3.
Figure 6:
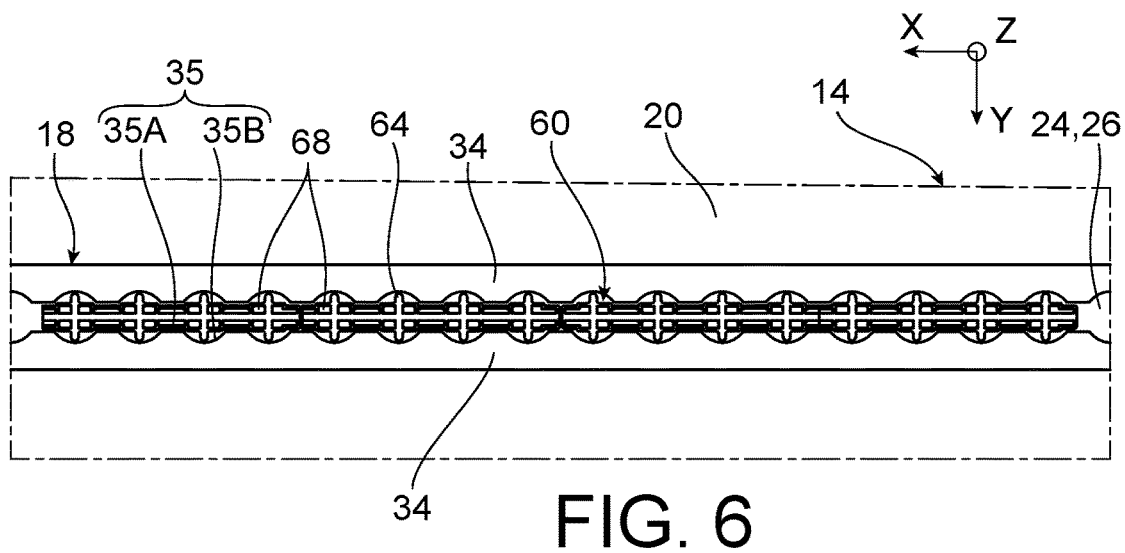
FIG. 6 is a view similar to FIG. 5, of a floor structure according to a second preferred embodiment of the disclosure herein.

In the example illustrated, the cells 68 emerge through the first end 62 and the second end 64, and therefore in particular through the covering element 66, which comprises openings 69 for this purpose (FIG. 5).

As a variant, other forms and/or orientations of the cells 68 are possible without departing from the scope of the disclosure herein, depending notably on the supporting firmness sought for the covering element 66, on the density of the material forming the cellular structure 68 and, if applicable, on the anticorrosion product intended to fill the cells or at the very least to cover the surfaces delimiting the recess 24, as will emerge more clearly hereinbelow, or even on the fluidity of the anticorrosion product, which conditions the ability of the product to spread over the surfaces to be protected.

Preferably, the cellular supporting structure 60 is made from a plastic material, which makes it possible to limit the weight of the floor structure.

For each rail 18, one or more segments of the recess 24, which have no attachment element, each comprise one or more cellular supporting structures 60, and are each covered by one or more covering elements 66. One or more rails 18 of the floor structure can be totally without attachment elements, in which case one or more cellular supporting structures 60 occupy all of the recess 24 defined by such a rail, and one or more covering elements 66 cover all of the recess 24.

In a first preferred embodiment of the disclosure herein, the covering element 66 is formed in a single piece with the cellular supporting structure 60. The duly formed piece is represented alone in FIG. 4 and is represented in place in the recess 24 of a rail 18 in FIG. 5.

Figure 7:
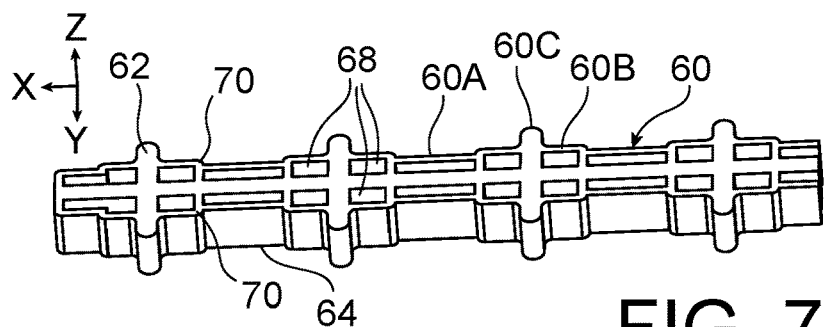
FIG. 7 is a perspective schematic view of a cellular supporting structure belonging to the floor structure of FIG. 6.
Figure 8:
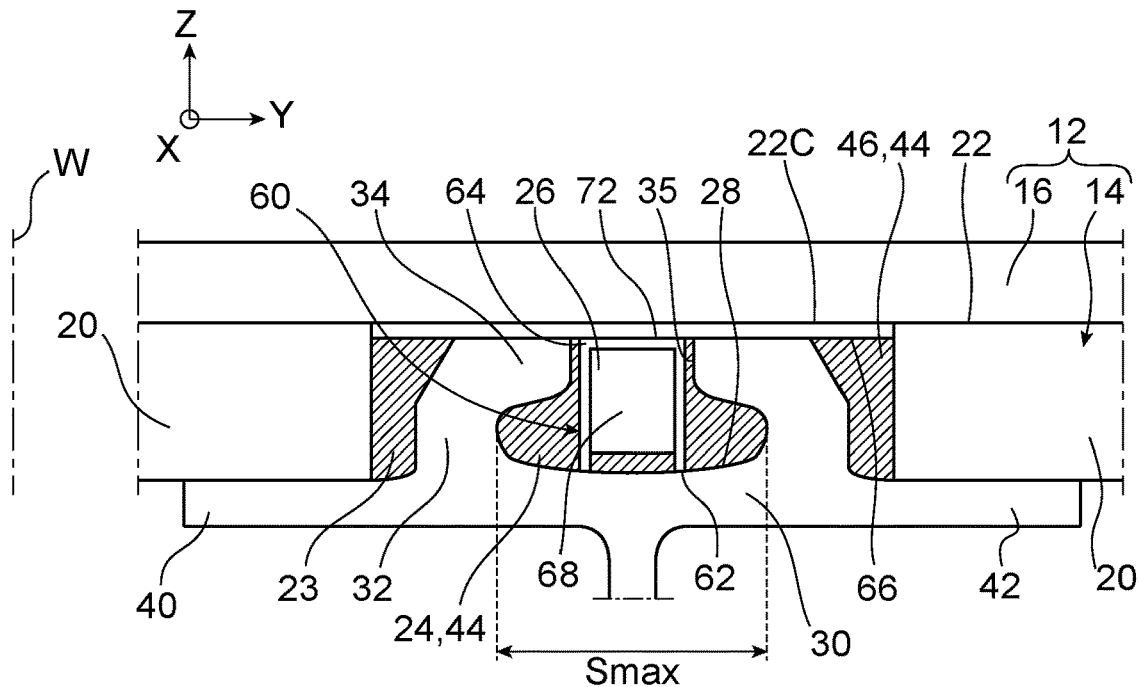
FIG. 8 is a view similar to FIG. 3A, illustrating a variant of the disclosure herein.

In a second preferred embodiment of the disclosure herein, the covering element 66 is formed independently of the cellular supporting structure 60. The latter is visible alone, in FIG. 7, and is visible within the recess 24 of a rail 18 from which the covering element 66 has been removed, in FIG. 6. As appears more clearly in FIG. 6, the respective edges 35 of the lips 32 have an alternation of teeth 35A and concave voids 35B intended for the axial retention of attachment elements within the recess 24. The cellular supporting structure 60 is adapted to best occupy the space delimited by the opening 26 formed between the edges 35 and thus constitute an optimal support for the covering element 66. Thus, as FIG. 7 shows, this structure comprises an alternation of first rectangular portions 60A, and of second rectangular portions 60B wider than the first rectangular portions 60A, when seen from above. These second rectangular portions 60B also each comprise two opposing lateral ribs, for example formed by a corresponding median partition wall 60C extending beyond each lateral side of the second rectangular portion. Each junction between a first rectangular portion 60A and an adjacent second rectangular portion 60B defines two corresponding shoulders 70 each constituting an abutment with respect to a corresponding corner of a tooth 35A of a corresponding edge 35.

In both cases, the cellular supporting structure 60 is preferably embedded in an anticorrosion product 44 filling the corresponding segment of the recess 24 (this anticorrosion product corresponding to the shaded zones in FIG. 3A).

The through nature of the cells 68 best facilitates the distribution of the anticorrosion product 44 in the recess 24 around and within the cellular supporting structure 60, on the surfaces to be protected against corrosion.

Moreover, because of the support offered by the cellular supporting structure 60, the covering element 66 can have a less rigid design, and in particular be thinner, than in the state of the art. The covering element 66 is for example composed of a single polyester strip.

Thus, the covering element 66 can in particular be disposed substantially flush with respect to the bearing surface 22. To this end, the covering element 66 is advantageously housed in the space 23 defined between the two floor panels 20.

The result thereof is a reduction of the step up generated with respect to the bearing surface 22, even, in this particular case, a total absence of step up with respect to the bearing surface 22.

Comfort is thus improved for the users, and the life of the covering 16 is extended because of the absence of damage upon repeated passages of people or trolleys above a rail 18.

Another advantage of the disclosure herein lies in the fact that the presence of a cellular supporting structure 60 in a corresponding recess 24 reduces the quantity of anticorrosion product needed to fill the recess.

As explained above, the geometry of the cells of the cellular supporting structure 60 is adaptable, notably according to characteristics of the anticorrosion product 44 used.

For example, the cells 68 do not necessarily pass right through. A variant of the disclosure herein, illustrated in FIG. 8, thus notably provides for the cellular supporting structure 60 to have a solid top surface 72 and be thus closed on the top side, and for the anticorrosion product (shading in FIG. 8) to be disposed preferentially over any surface delimiting the recess 24 and which would otherwise be exposed to the air, therefore at least on each side of the cellular supporting structure 60 and below the structure, without totally filling the cells 68. The cellular supporting structure 60 thus rests by its open side on a layer of anticorrosion product, such that air is imprisoned within each of the cells 68 above the layer of anticorrosion product. Such a configuration allows for an additional saving of anticorrosion product and a reduction of additional weight, without increasing the risk of corrosion. It should be noted that the cellular supporting structure 60 according to the example illustrated in FIG. 8 comprises a single longitudinal row of cells, such that only one cell is visible in cross section in FIG. 8.

The cellular supporting structure 60, and if applicable the covering element 66, can be manufactured by any appropriate technique, notably by additive manufacturing, injection molding, etc.

The disclosure herein is of course applicable to other types of floor structures for aircraft, for example to the structures in which the rails are incorporated in the floor panels, as described in the document U.S. Pat. No. 8,544,794B2. As a variant, the rail can be of a different type, for example of the type described in the document FR2953485A1, in which the rail delimits the top side of the recess while other structural elements not described delimit the lateral sides and the bottom side of the recess. Such a rail comprises a plurality of openings, for example of circular form.

Figure 9:
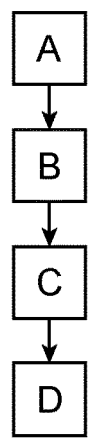
FIG. 9 is a flow diagram illustrating a method for manufacturing a floor structure according to the preferred embodiments of the disclosure herein.

Referring to FIG. 9 and to FIGS. 3 through 8, the manufacturing of a floor structure 14 of the type described above comprises steps of:

A) provision of a rail 18 defining a recess 24 having an opening 26 on a top side and a bottom 28 opposite the opening, the opening 26 preferably having a narrower section than a maximum section Smax of the recess 24 defined between the opening 26 and the bottom 28 of the recess so as to allow the retention of attachment elements within the recess;

B) incorporation of the rail 18 in a base floor structure having, on a top side, a bearing surface 22, such that the opening 26 of the recess 24 of the rail emerges in the bearing surface 22;

C) placement of a cellular supporting structure 60 in at least one segment of the recess 24 of the rail, such that the cellular supporting structure has a first end 62 that rests on the bottom 28 of the recess, and a second end 64 opposite the first end, the cellular supporting structure 60 preferably comprising cells 68 extending in a direction going from the first end to the second end;

D) if applicable, arrangement of an anticorrosion product 44 in the recess 24 at least under the cellular supporting structure 60 and on either side of the cellular supporting structure 60;

E) if applicable, placement of at least one covering element 66 over the second end 64 of the cellular supporting structure 60, so as to provide a complementary bearing surface 22C above the opening 26 of the recess 24.

The step C of placement of the cellular supporting structure 60 can be implemented after or before the step B of incorporation of the rail in the base floor structure, the latter having to be understood to be the floor structure possibly without cellular supporting structure 60 and covering element 66.

The step D of placement of the anticorrosion product 44 can be implemented after or before the step C of placement of the cellular supporting structure 60.

The step E of placement of at least one covering element 66 is of course applicable only when such a covering element is not incorporated in the cellular supporting structure 60 and therefore has not already been put in place concomitantly therewith. This step can be implemented after or before the step B of incorporation of the rail in the base floor structure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A floor for an aircraft, the floor comprising:
   a floor structure comprising:
      a bearing surface on a top side of the floor structure; and
      at least one rail comprising a recess having at least one opening, which is on a same side as the bearing surface, and a bottom surface, which is arranged opposite the opening, such that the at least one rail is configured to house one or more attachment elements within the recess associated therewith;
   at least one cellular supporting structure; and
   at least one covering element positioned above at least one segment of the recess to provide a complementary bearing surface above the opening;
   wherein the at least one cellular supporting structure comprises a first end, which rests within the recess and on the bottom surface of the recess, and a second end, which is opposite the first end and is configured to support the covering element.

2. The floor according to claim 1, wherein the cellular supporting structure comprises cells extending in a direction going from the first end to the second end.

3. The floor according to claim 1, wherein an anticorrosion product is disposed in the recess at least under the cellular supporting structure and on either side of the cellular supporting structure.

4. The floor according to claim 1, wherein the covering element is formed in a single piece with the cellular supporting structure.

5. The floor according to claim 1, wherein the covering element is formed independently of the cellular supporting structure.

6. The floor structure according to claim 1, wherein the covering element is flush with the bearing surface.

7. The floor according to claim 1, wherein the floor structure comprises at least two floor panels that define the bearing surface, and wherein the rail extends in a space defined between the two floor panels.

8. The floor according to claim 7, wherein the covering element is housed in the space defined between the two floor panels.

9. The floor according to claim 1, wherein the recess is a groove defined by the rail, and the opening is a longitudinal opening defined between two top lips of the rail.

10. The floor according to claim 1, wherein the opening of the recess has a narrower cross section than a maximum cross section of the recess, the maximum cross section being defined between the opening and the bottom surface of the recess, to allow retention of attachment elements within the recess by abutment effect.

11. An aircraft comprising the floor according to claim 1.

12. A method for manufacturing a floor for an aircraft, the method comprising:
   providing a floor structure comprising:
      a bearing surface on a top side of the floor structure;
      at least one rail comprising a recess having at least one opening, which is on a same side as the bearing surface, and a bottom surface, which is arranged opposite the opening, such that the rail is configured to house one or more attachment elements within the recess associated therewith, wherein the rail is incorporated in the floor structure such that the opening of the recess of the rail emerges in the bearing surface; and at least one cellular supporting structure; and placing, before or after the stop b rail is incorporated into the floor structure, the cellular supporting structure in at least one segment of the recess of the rail, such that the cellular supporting structure is positioned such that a first end of the cellular supporting structure rests within the recess and on the bottom surface of the recess and a second end of the cellular supporting structure is opposite the first end; and positioning, after the cellular supporting structure is placed in the at least one segment of the recess of the rail, at least one covering element so that the at least one covering is supported by the second end of the cellular supporting structure to provide a complementary bearing surface above the opening of the recess.

13. The method according to claim 12, comprising arranging an anticorrosion product in the recess at least under the cellular supporting structure and on either side of the cellular supporting structure.

14. The method according to claim 12, wherein the cellular supporting structure comprises cells extending in a direction going from the first end to the second end.

15. The method according to claim 12, wherein the covering element is formed in a single piece with the cellular supporting structure.

16. The method according to claim 12, wherein:
the covering element is formed independently of the cellular supporting structure; or
the covering element is flush with the bearing surface.

17. The method according to claim 12, wherein the floor structure comprises at least two floor panels that define the bearing surface, and wherein the rail extends in a space defined between the two floor panels.

18. The method according to claim 17, wherein the covering element is housed in the space defined between the two floor panels.

19. The method according to claim 12, wherein the recess is a groove defined by the rail, and the opening is a longitudinal opening defined between two top lips of the rail.

20. The method according to claim 12, wherein the opening of the recess has a narrower cross section than a maximum cross section of the recess, the maximum cross section being defined between the opening and the bottom surface of the recess, to allow retention of attachment elements within the recess by abutment effect.

* * * * *